(12) United States Patent
Deng et al.

(10) Patent No.: US 12,252,404 B2
(45) Date of Patent: Mar. 18, 2025

(54) NUTRIENT RECOVERY FROM HYDROTHERMAL LIQUEFACTION BIOCHAR

(71) Applicants: Shuguang Deng, Mesa, AZ (US); Peter Lammers, Tempe, AZ (US); Kodanda Phani Raj Dandamudi, Tempe, AZ (US); Mark Seger, Gilbert, AZ (US)

(72) Inventors: Shuguang Deng, Mesa, AZ (US); Peter Lammers, Tempe, AZ (US); Kodanda Phani Raj Dandamudi, Tempe, AZ (US); Mark Seger, Gilbert, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/160,677

(22) Filed: Jan. 27, 2023

(65) Prior Publication Data

US 2023/0242405 A1 Aug. 3, 2023

Related U.S. Application Data

(60) Provisional application No. 63/305,495, filed on Feb. 1, 2022.

(51) Int. Cl.
*C01B 32/318* (2017.01)
*C01B 32/378* (2017.01)

(52) U.S. Cl.
CPC .......... *C01B 32/318* (2017.08); *C01B 32/378* (2017.08)

(58) Field of Classification Search
CPC ...... C01B 32/318; C01B 32/378; Y02E 50/10
See application file for complete search history.

(56) References Cited

U.S. PATENT DOCUMENTS

| | | | |
|---|---|---|---|
| 10,077,454 B1 * | 9/2018 | Davis | ....................... C12P 7/065 |
| 11,104,611 B2 | 8/2021 | Ofori-Boadu et al. | |
| 11,261,315 B1 | 3/2022 | Hosseinnezhad Mohtarami et al. | |
| 2017/0190898 A1 | 7/2017 | Puchalski et al. | |
| 2017/0247542 A1 | 8/2017 | Williams et al. | |
| 2018/0148575 A1 | 5/2018 | Kurth et al. | |
| 2019/0119499 A1 | 4/2019 | Kurth et al. | |
| 2019/0241847 A1 * | 8/2019 | Krivov | .................. C12M 33/00 |
| 2021/0147751 A1 | 5/2021 | Fini et al. | |
| 2022/0204773 A1 | 6/2022 | Fini et al. | |
| 2022/0355512 A1 | 11/2022 | Fini et al. | |
| 2023/0159390 A1 | 5/2023 | Fini et al. | |
| 2023/0242820 A1 | 8/2023 | Fini et al. | |
| 2023/0303804 A1 | 9/2023 | Fini et al. | |

(Continued)

FOREIGN PATENT DOCUMENTS

WO WO 2015/127561 9/2015

OTHER PUBLICATIONS

Abdullah et al., "Identification of Hydrophilic Phenolic Compounds Derived from Palm Oil Products," Journal of Oil Palm Research, Jun. 2020, 32(2):258-270.

(Continued)

*Primary Examiner* — Latosha Hines
(74) *Attorney, Agent, or Firm* — Fish & Richardson P.C.

(57) ABSTRACT

Processing algae includes liquefying algae to yield a mixture including biocrude oil, biochar, and an aqueous component, and treating the biochar to yield a nutrient composition including ammoniacal nitrogen and phosphate.

17 Claims, 6 Drawing Sheets

(56) References Cited

U.S. PATENT DOCUMENTS

2023/0323128 A1 10/2023 Fini et al.
2023/0374310 A1 11/2023 Fini et al.

OTHER PUBLICATIONS

Alba, L.G., Torri, C., Fabbri, D., Kersten, S.R.A., Brilman, D.W.F.W., 2013. Microalgae growth on the aqueous phase from hydrothermal liquefaction of the same microalgae. Chem. Eng. J. 228, 214-223.

Aysu, T., Demirba, A., Bengü, A.Ş., Küçük, M.M., 2015. Evaluation of Eremurus spectabilis for production of bio-oils with supercritical solvents. Process Saf. Environ. Prot. 94, 339-349.

Barreiro, D.L., Prins, W., Ronsse, F., Brilman, W., 2013. Hydrothermal liquefaction (HTL) of microalgae for biofuel production: state of the art review and future prospects. Biomass and Bioenergy 53, 113-127.

Beal, C.M., Archibald, I., Huntley, M.E., Greene, C.H., Johnson, Z.I., 2018. Integrating algae with bioenergy carbon capture and storage (ABECCS) increases sustainability. Earth's Futur. 6, 524-542.

Beckinghausen, A., Odlare, M., Thorin, E., Schwede, S., 2020. From removal to recovery: An evaluation of nitrogen recovery techniques from wastewater. Appl. Energy 263, 114616, 15 pages.

Behl, K., Sinha, S., Sharma, M., Singh, R., Joshi, M., Bhatnagar, A., Nigam, S., 2019. One-time cultivation of Chlorella pyrenoidosa in aqueous dye solution supplemented with biochar for microalgal growth, dye decolorization and lipid production. Chem. Eng. J. 364, 552-561.

Bouwman, L., Goldewijk, K.K., Van Der Hoek, K.W., Beusen, A.H.W., Van Vuuren, D.P., Willems, J., Rufino, M.C., Stehfest, E., 2013. Exploring global changes in nitrogen and phosphorus cycles in agriculture induced by livestock production over the 1900-2050 period. Proc. Natl. Acad. Sci. 110, 20882-20887.

Bridgwater, A. V, 2012. Review of fast pyrolysis of biomass and product upgrading. Biomass and bioenergy 38, 68-94.

Chisti, Y., 2007. Biodiesel from microalgae. Biotechnol. Adv. 25, 294-306.

Cisse, L., Mrabet, T., 2004. World phosphate production: overview and prospects. Phosphorus Res. Bull. 15, 21-25.

Collard, F.-X., Blin, J., 2014. A review on pyrolysis of biomass constituents: Mechanisms and composition of the products obtained from the conversion of cellulose, hemicelluloses and lignin. Renew. Sustain. Energy Rev. 38, 594-608.

Dandamudi, K.P.R., Muhammed Luboowa, K., Laideson, M., Murdock, T., Seger, M., McGowen, J., Lammers, P.J., Deng, S., 2020. Hydrothermal liquefaction of Cyanidioschyzon merolae and Salicornia bigelovii Torr.: The interaction effect on product distribution and chemistry. Fuel, 277:118146, 11 pages.

Dandamudi, K.P.R., Muppaneni, T., Markovski, J.S., Lammers, P., Deng, S., 2019. Hydrothermal liquefaction of green microalga Kirchneriella sp. under sub-and super-critical water conditions. Biomass and bioenergy 120, 224-228.

Dandamudi, K.P.R., Muppaneni, T., Sudasinghe, N., Schaub, T., Holguin, F.O., Lammers, P.J., Deng, S., 2017. Co-liquefaction of mixed culture microalgal strains under sub-critical water conditions. Bioresour. Technol. 236, 129-137.

Dandamudi, K.P.R., Murdock, T., Lammers, P.J., Deng, S., Fini, E.H., 2021. Production of functionalized carbon from synergistic hydrothermal liquefaction of microalgae and swine manure. Resour. Conserv. Recycl. 170, 105564, 11 pages.

Dandamudi, Melvin Mathew, Thinesh Selvaratnam, Tapaswy Muppaneni, Mark Seger, Peter Lammers, Shuguang Deng, "Recycle of nitrogen and phosphorus in hydrothermal liquefaction biochar from Galdieria sulphuraria to cultivate microalgae" Resources, Conservation & Recycling 171 (2021) 105644, 9 pages.

De Caprariis, B., De Filippis, P., Hernandez, A.D., Petrucci, E., Petrullo, A., Scarsella, M., Turchi, M., 2017. Pyrolysis wastewater treatment by adsorption on biochars produced by poplar biomass. J. Environ. Manage. 197, 231-238.

Demirbas, A., 2009. Political, economic and environmental impacts of biofuels: A review. Appl. Energy 86, S108-S117.

Desmidt, E., Ghyselbrecht, K., Zhang, Y., Pinoy, L., Van der Bruggen, B., Verstraete, W., Rabaey, K., Meesschaert, B., 2015. Global phosphorus scarcity and full-scale P-recovery techniques: a review. Crit. Rev. Environ. Sci. Technol. 45, 336-384.

Dhasmana et al. ""Rheological and Chemical Characterization of Biobinders from Different Biomass Resources"" Published: Apr. 28, 2019. Journal of the Transportation Research Board No. 2505. pp. 121-129. (Year: 2019).

Gai, C., Liu, Z., Han, G., Peng, N., Fan, A., 2015. Combustion behavior and kinetics of low-lipid microalgae via thermogravimetric analysis. Bioresour. Technol. 181, 148-154.

Godwin, C.M., Hietala, D.C., Lashaway, A.R., Narwani, A., Savage, P.E., Cardinale, B.J., 2017. Algal polycultures enhance coproduct recycling from hydrothermal liquefaction. Bioresour. Technol. 224, 630-638.

Gross, J.D., Matsuo, H., Fletcher, M., Sachs, A.B., Wagner, G., 2001. Interactions of the eukaryotic translation initiation factor eIF4E, in: Cold Spring Harbor Symposia on Quantitative Biology. Cold Spring Harbor Laboratory Press, pp. 397-402.

He, S., Zhao, M., Wang, J., Cheng, Z., Yan, B., Chen, G., 2020. Hydrothermal liquefaction of low-lipid algae Nannochloropsis sp. and Sargassum sp.: Effect of feedstock composition and temperature. Sci. Total Environ. 712, 135677, 8 pages.

Ibrahim, A.F.M., Dandamudi, K.P.R., Deng, S., Lin, J.Y.S., 2020. Pyrolysis of hydrothermal liquefaction algal biochar for hydrogen production in a membrane reactor. Fuel 265, 116935, 8 pages.

Ikenaga, N., Ueda, C., Matsui, T., Ohtsuki, M., Suzuki, T., 2001. Co-liquefaction of micro algae with coal using coal liquefaction catalysts. Energy and Fuels, 15, 350-355.

International Search Report and Written Opinion in International Appln. No. PCT/US2021/052701, dated Jan. 28, 2022, 15 pages.

Jiang, L., Liang, B., Xue, Q., Yin, C., 2016. Characterization of phosphorus leaching from phosphate waste rock in the Xiangxi River watershed, Three Gorges Reservoir, China. Chemosphere 150, 130-138.

Karbakhshravari, M., Abeysiriwardana-Arachchige, I.S.A., Henkanatte-Gedera, S.M., Cheng, F., Papelis, C., Brewer, C.E., Nirmalakhandan, N., 2020. Recovery of struvite from hydrothermally processed algal biomass cultivated in urban wastewaters. Resour. Conserv. Recycl. 163, 105089, 10 pages.

Kruse, A., Dinjus, E., 2007. Hot compressed water as reaction medium and reactant: properties and synthesis reactions. J. Supercrit. Fluids 39, 362-380.

Lammers, P.J., Huesemann, M., Boeing, W., Anderson, D.B., Arnold, R.G., Bai, X., Bhole, M., Brhanavan, Y., Brown, L., Brown, J., 2017. Review of the cultivation program within the National Alliance for Advanced Biofuels and Bioproducts. Algal Res. 22, 166-186.

Leng, L., Yang, L., Chen, J., Hu, Y., Li, Hailong, Li, Hui, Jiang, S., Peng, H., Yuan, X., Huang, H., 2021. Valorization of the aqueous phase produced from wet and dry thermochemical processing biomass: A review. J. Clean. Prod., 294, 126238, 26 pages.

Muppaneni, T., Reddy, H.K., Selvaratnam, T., Dandamudi, K.P.R., Dungan, B., Nirmalakhandan, N., Schaub, T., Omar Holguin, F., Voorhies, W., Lammers, P., Deng, S., 2017. Hydrothermal liquefaction of Cyanidioschyzon merolae and the influence of catalysts on products. Bioresour. Technol. 223, 91-97.

Ng et al., "Detection of cis-Vaccenic Acid in Palm Oil by 13C NMR Spectroscopy," Lipids, 1988, 23:140-143.

Patil, P.D., Dandamudi, K.P.R., Wang, J., Deng, Q., Deng, S., 2018. Extraction of bio-oils from algae with supercritical carbon dioxide and co-solvents. J. Supercrit. Fluids 135, 60-68.

Pomerantz et al., "Sulfur speciation in kerogen and bitumen from gas and oil shales," Organic Geochemistry, Dec. 2013, 68(31):5-12.

Reddy, H.K., Muppaneni, T., Sun, Y., Li, Y., Ponnusamy, S., Patil, P.D., Dailey, P., Schaub, T., Holguin, F.O., Dungan, B., Cooke, P., Lammers, P., Voorhies, W., Lu, X., Deng, S., 2014. Subcritical water extraction of lipids from wet algae for biodiesel production. Fuel 133, 73-81.

Samieadel, A., Rajib, A.I., Dandamudi, K.P.R., Deng, S., Fini, E.H., 2020. Improving recycled asphalt using sustainable hybrid rejuvena-

(56) References Cited

OTHER PUBLICATIONS tors with enhanced intercalation into oxidized asphaltenes nanoaggregates. Constr. Build. Mater. 262, 120090, 11 pages.

Selvaratnam, T., Pegallapati, A.K., Montelya, F., Rodriguez, G., Nirmalakhandan, N., Van Voorhies, W., Lammers, P.J., 2014. Evaluation of a thermo-tolerant acidophilic alga, Galdieria sulphuraria, for nutrient removal from urban wastewaters. Bioresour. Technol. 156, 395-399.

Selvaratnam, T., Pegallapati, A.K., Reddy, H., Kanapathipillai, N., Nirmalakhandan, N., Deng, S., Lammers, P.J., 2015. Algal biofuels from urban wastewaters: Maximizing biomass yield using nutrients recycled from hydrothermal processing of biomass. Bioresour. Technol. 182, 232-238.

Selvaratnam, T., Reddy, H., Muppaneni, T., Holguin, F.O., Nirmalakhandan, N., Lammers, P.J., Deng, S., 2015. Optimizing energy yields from nutrient recycling using sequential hydrothermal liquefaction with Galdieria sulphuraria. Algal Res. 12, 74-79.

Son, E.-B., Poo, K.-M., Chang, J.-S., Chae, K.-J., 2018. Heavy metal removal from aqueous solutions using engineered magnetic biochars derived from waste marine macro-algal biomass. Sci. Total Environ. 615, 161-168.

Tian, C., Li, B., Liu, Z., Zhang, Y., Lu, H., 2014. Hydrothermal liquefaction for algal biorefinery: A critical review. Renew. Sustain. Energy Rev. 38, 933-950.

Toor, S.S., Reddy, H., Deng, S., Hoffmann, J., Spangsmark, D., Madsen, L.B., Holm-Nielsen, J.B., Rosendahl, L.A., 2013. Hydrothermal liquefaction of Spirulina and Nannochloropsis salina under subcritical and supercritical water conditions. Bioresour. Technol. 131, 413-419.

U.S. Energy Information Administration (EIA), 2019. Annual Energy Outlook 2019 with Projections to 2050. 83 pages.

Wang, J., Krishna, R., Yang, J., Dandamudi, K.P.R., Deng, S., 2015. Nitrogen-doped porous carbons for highly selective $CO_2$ capture from flue gases and natural gas upgrading. Mater. Today Commun. 4, 156-165.

Wang, J., Peng, X., Chen, X., Ma, X., 2019. Co-liquefaction of low-lipid microalgae and starch-rich biomass waste: The interaction effect on product distribution and composition. J. Anal. Appl. Pyrolysis 139, 250-257.

Xu, D., Lin, G., Guo, S., Wang, S., Guo, Y., Jing, Z., 2018. Catalytic hydrothermal liquefaction of algae and upgrading of biocrude: a critical review. Renew. Sustain. Energy Rev. 97, 103-118.

Xu, D., Savage, P.E., 2017. Effect of temperature, water loading, and Ru/C catalyst on water-insoluble and water-soluble biocrude fractions from hydrothermal liquefaction of algae. Bioresour. Technol. 239, 1-6.

Yang, C.-M., Lee, C.-G., Won, J.-I., 2017. Improvement of Biocrude Oil Yield and Phosphorus Content by Hydrothermal Liquefaction Using Microalgae. Chem. Eng. Technol. 40, 2188-2196.

Zhan, L., Jiang, L., Zhang, Y., Gao, B., Xu, Z., 2020. Reduction, detoxification and recycling of solid waste by hydrothermal technology: A review. Chem. Eng. J. 390, 124651, 10 pages.

* cited by examiner

NUTRIENT RECOVERY FROM HYDROTHERMAL LIQUEFACTION BIOCHAR

CROSS-REFERENCE TO RELATED APPLICATION

This application claims the benefit of U.S. Patent Application 63/305,495 filed on Feb. 1, 2022, which is incorporated herein by reference in its entirety.

TECHNICAL FIELD

This invention relates to the recovery of nutrients from biochar formed by hydrothermal liquefaction of biomass.

BACKGROUND

Hydrothermal liquefaction (HTL) is a thermochemical process that uses an elevated temperature and pressure to convert wet biomass into biocrude (an energy-intensive liquid fuel), soluble chemicals in a water phase, and a solid residue (biochar). The HTL process takes advantage of properties of water that change when water subjected to heat under pressure but maintained in the liquid state (e.g., subcritical water conditions). Changes to these properties of water, including dielectric constant and density, result in changes to its solvent and reactant properties which can promote chemical deconstruction of biomass.

During the HTL process, the macromolecules of the biomass are broken down into smaller molecules. Many of the produced molecules are unstable and reactive and recombine into larger molecules. During this process, oxygen in the biomass is removed (e.g., by dehydration or decarboxylation). The chemical properties of the biocrude and biochar depend on the biomass substrate composition.

SUMMARY

This disclosure describes a method to extract nitrogen and phosphorus-rich nutrients from the products of hydrothermal liquefaction (HTL) of biomass and the use of these nutrients in the cultivation of algae. HTL of biomass yields products including biocrude oil (an energy-intensive liquid fuel), biochar, and soluble chemicals in a water phase. In some embodiments the biomass used in the HTL process includes algal biomass. HTL reaction conditions such as temperature, pressure, and residence time can be selected to maximize the conversion of biomass into products. The disclosed method includes extraction of nitrogen and phosphorus from the HTL-generated biochar by leaching at various pH levels to yield leached phosphate and ammoniacal nitrogen-based nutrients. The nutrients can be further treated and used for cultivating the growth of algae. This algae can be then used for HTL and thus the disclosed method forms a sustainable and recyclable process.

In a first general aspect, processing algae includes liquefying algae to yield a mixture including biocrude oil, biochar, and an aqueous component, and treating the biochar to yield a nutrient composition including ammoniacal nitrogen and phosphate.

Implementations of the first general aspect can include one or more of the following features.

In some cases, liquefying the algae includes heating the algae to a temperature in a range of about 300° C. to about 350° C. Liquefying the algae can occur at a pressure greater than atmospheric pressure. In some implementations, the pressure greater than atmospheric pressure includes pressure in a range of about 20 bar to about 100 bar. In some cases, the algae include *Galdieria sulphuraria*. The first general aspect can further include separating the biochar from the mixture before treating the biochar. In some cases, treating the biochar includes extracting the ammoniacal nitrogen and phosphate from the biochar. In some implementations, treating the biochar further includes forming an aqueous mixture including the biochar. The aqueous mixture can include an algal growth medium. In some cases, the algal growth medium includes a cyanidium mixture.

Treating the biochar can further include adjusting a pH of the aqueous mixture to a pH less than 7. In some cases, adjusting the pH includes combining acid with the aqueous mixture. In some implementations, adjusting the pH of the aqueous mixture to a pH less than 7 includes adjusting the pH of the aqueous mixture in a range of about 2 to about 3. The first general aspect can further include removing the biochar from the aqueous mixture to yield the nutrient composition including the ammoniacal nitrogen and the phosphate. In some cases, the first general aspect further includes cultivating additional algae with the nutrient composition. In some implementations, the first general aspect further includes harvesting the additional algae from the nutrient composition to yield harvested algae. The first general aspect can further include liquefying the harvested algae. In some cases, the first general aspect further includes forming a biofuel from the harvested algae. In some implementations, the first general aspect further includes combining the nutrient composition with an algal growth medium. In some cases, the algal growth medium includes a cyanidium medium.

Advantages of the described processes include the optimized extraction of nitrogen- and phosphorus-based nutrients from the products of biomass HTL. The use of these nutrients for the growth of energy-rich algae creates a recyclable process for the generation of sustainable energy products.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes a method to extract nitrogen- and phosphorus-rich nutrients from the products of hydrothermal liquefaction (HTL) of biomass and the use of these nutrients in the cultivation of algae. HTL of biomass yields products including biocrude oil (an energy-intensive liquid fuel), biochar, and soluble chemicals in a water phase. In some embodiments the biomass used in the HTL process includes algal biomass. HTL reaction conditions including temperature, pressure, and residence time are variables that are optimized herein to maximize the conversion of biomass into products. The disclosed method extracts the nitrogen and phosphorus from the HTL-generated biochar by leaching at various pH levels to yield leached phosphate and ammoniacal nitrogen-based nutrients. The nutrients are further treated and used for cultivating the growth of algae. This algae can be then used for HTL. Thus, the disclosed method forms a sustainable and recyclable process.

Figure 1:
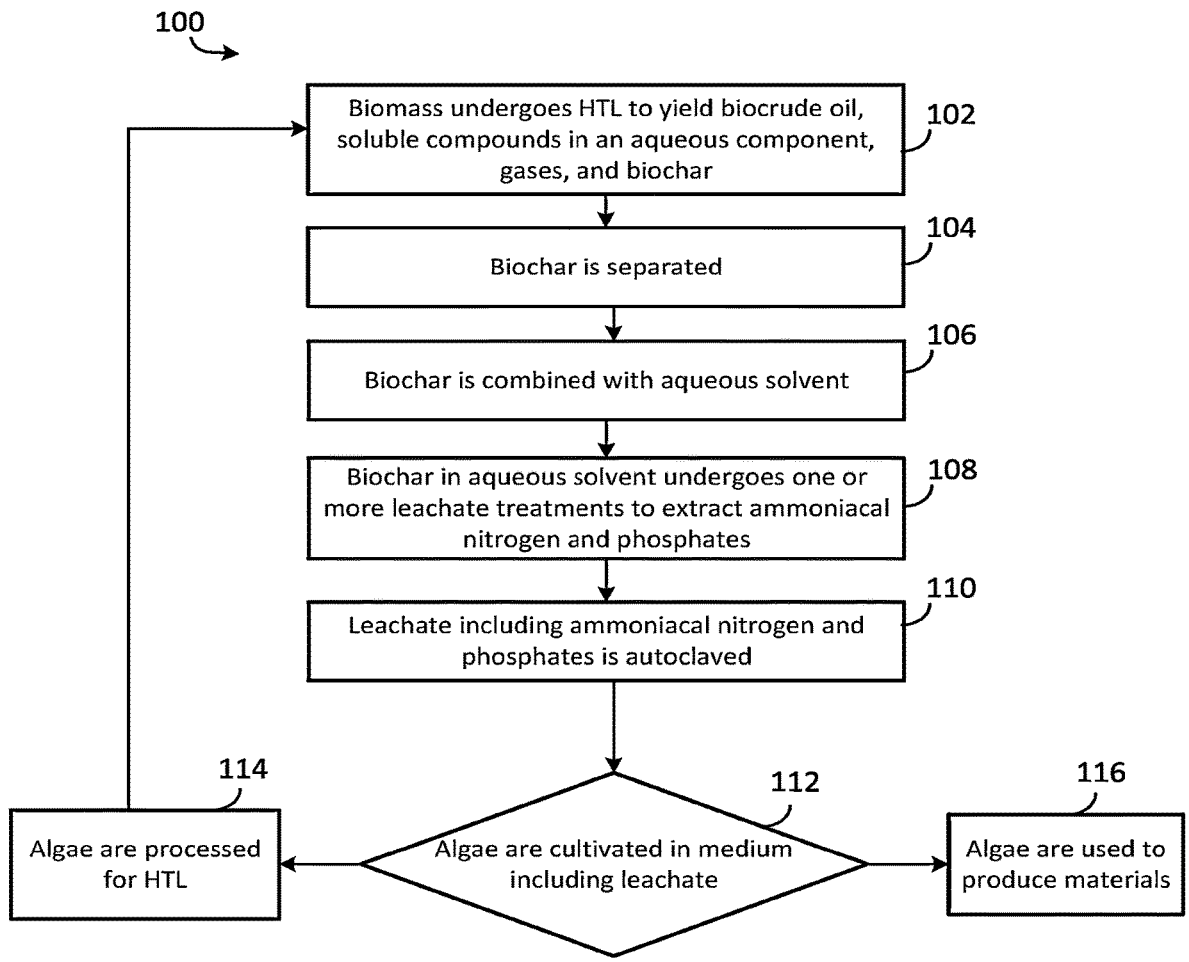
FIG. 1 is a flow chart showing operations in a process for the extraction and recycling of nutrients from the products of biomass hydrothermal liquefaction (HTL).

FIG. 1 is a flow chart showing operations in a nutrient recovery process 100 for the extraction and recycling of nutrients from the products of biomass HTL. In 102, biomass undergoes HTL in a reactor to yield a first mixture including biocrude oil, soluble compounds in an aqueous component, gases, and biochar. A suitable reactor includes a Parr Instrument company 4576A stainless steel benchtop reactor with a 4843-controller. HTL reaction conditions such as temperature, pressure, and residence time can be varied to control the conversion of biomass into products. The mixture inside the reactor can be heated to a temperature in a range of about 300° C. to about 350° C. The pressure of the mixture in the reactor can be greater than atmospheric pressure (e.g., in a range of about 20 bar to about 100 bar).

The biomass used in step 102 can be algae. In one example, the algae is *Galdieria sulphuraria*. In 104, the biochar is separated from the first mixture. In 106, the biochar is combined with an aqueous solvent to yield a second mixture. The aqueous solvent can be deionized water or nitrogen- and phosphorus-free cyandinium medium (CM). The pH of the aqueous solvent can be adjusted with acid to a pH less than 7 (e.g., in a range of about 2 to about 3). In 108, the second mixture undergoes one or more leachate treatments. A leachate treatment includes separating an aqueous phase (e.g., leachate) from the second mixture, and replacing the removed leachate with aqueous solvent having a pH similar to that of the removed leachate. The leachate treatment includes extracting ammoniacal nitrogen ($NH_3$—N) and phosphates ($PO_4^{3-}$) from the biochar into the leachate. In 110, the leachate including ammoniacal nitrogen and phosphates is heated (e.g., autoclaved).

In 112, algae are cultivated in a medium including the leachate with nutrients extracted from the biochar. The algae can include *Galdieria sulphuraria*. From 112, the algae can be recycled to an earlier stage in nutrient recovery process 100, provided to another process for production of other materials, or both. In 114, the algae cultivated in 112 can be processed for use as biomass for HTL as in 102. In 116, the algae cultivated in 112 can be provided as feedstock to other processes for the sustainable production of a variety of materials (e.g., biofuel).

Examples

Algae strain collection and maintenance. The analysis was performed with the red algae *Galdieria sulphuraria* (GS); strain: CCMEE 5587.1 (GS 5587.1). The GS 5587.1 cultures used as inoculum for analysis described herein were scaled up from single colonies and mono-algal cultures were verified by PCR and cleaved amplified polymorphic sequence (CAPS) analysis. These diagnostic tools were used to monitor cultures throughout the scale-up process and during experiments to ensure cultures were not compromised. Cyanidium medium (CM) at pH 2.5 was used for all cultures.

For each analytical run, verified stock cultures were scaled up indoors from plates to 15 L vertical panels. The cultures were supplemented with 2-3% $CO_2$ and maintained at 40° C. under a 14/10 h light (up to 450 μmol photons $m^{-2}$ $s^{-1}$)/dark cycle. Fifteen-liter indoor panels were then used to inoculate three 4×4' outdoor vertical panels (50 L; 4 cm light path), which were then allowed to grow to ~2 g/L. These cultures were pooled and used to inoculate 48' vertical panels (1200 L; 10 cm light path; starting density: ~0.25 g $L^{-1}$). This culture grew 0.08 g $L^{-1}$ $d^{-1}$ and the algal culture was harvested at a final density of 3 g $L^{-1}$ by centrifugation using a 1.5 HP Lavin 12-413v (AML Industries Inc; 3000× g's at ambient temperature). The concentrated paste/slurry (~30% solids) was stored at –20° C. to be used for analytical analysis and to produce HTL products.

Hydrothermal liquefaction of algal biomass and biochar collection. The temperature for liquefaction of GS 5587.1 to produce maximum biocrude can be between 300 and 350° C. The percentage of solid residues produced from the process decreased with temperature and was lowest at operational conditions above 300° C. GS was subjected to HTL at 300° C., 30 min residence time, and 20 wt % solid loading. The reactants were stirred continuously in a 250 ml Parr Instrument company 4576A stainless steel benchtop reactor with a 4843-controller. The gaseous yield and losses were measured as the difference of other significant products from the weight of dried microalgae used in each run. The HTL analysis runs were done in replicates (n=5), and the mean values (±SD) for the product yields were reported. Following the separation protocol, the biochar was collected and stored in glass vials for leaching experiments.

Analytical analysis of algal biomass and HTL products. The proximate and biochemical analysis of the GS 5587.1 biomass was performed. The elemental composition (C, H, N, S, and O) and calorific value (Higher Heating Value, HHV (MJ/kg)) were measured. Microalgae, HTL biocrude, and biochar were digested in a CEM Mars 6 microwave digestor (CEM Corporation, Matthews, North Carolina, USA) using the parameters given in Table 1. The digested samples were analyzed for the presence of inorganic trace elements using a Thermo Fischer iCAP 6300 ICP-OES (Inductively Coupled Plasma Optical Emission Spectrometry). The operational wavelength for detecting metallic ions in the biomass samples was set according to the vendor's operational manual in axial mode. In the case of multiple wavelengths, the average concentration of the metal was used to ascertain the amount of the metal present. The surface morphology, as well as energy-dispersive X-ray (EDX) analysis of the biochar understudy, was analyzed by an XL30 environmental scanning electron microscope (SEM).

TABLE 1

Microwave digestion parameters used for biomass, biocrude, biochar, and aqueous phase.

| | Digestion parameters for biomass, biocrude and biochar | | | | | | Digestion parameters for aqueous phase | | | | |
|---|---|---|---|---|---|---|---|---|---|---|---|
| Step | Target Temp °C. | Pressure Max bar | Ramp Time min | Hold Time min | Power % | Step | Target Temp °C. | Pressure Max bar | Ramp Time min | Hold Time min | Power % |
| 1 | 150 | 80 | 10 | 10 | 50 | 1 | 165 | 30 | 5 | 10 | 70 |
| 2 | 190 | 80 | 5 | 10 | 90 | 2 | 190 | 30 | 5 | 20 | 90 |
| 3 | 240 | 80 | 5 | 30 | 90 | 3 | 50 | 30 | 1 | 10 | 0 |
| 4 | 50 | 80 | 1 | 10 | 0 | | | | | | |
| 5 | Complexation of HF (Repeat step #3) | | | | | | | | | | |

Biochar leaching tests. A series of tests was performed to demonstrate the feasibility of leaching phosphates and ammoniacal nitrogen from the HTL biochar obtained from the conditions mentioned previously. For leaching experiments, biochar (30 mg) was placed in 50 ml polypropylene (PP) centrifuge tubes and then combined with 40 mL of nitrogen- and phosphorus-free CM or deionized water at different pH levels. The pH was adjusted to 0.5, 1.0, 2.5, and 7 for CM and 2.5 and 7.0 for deionized (DI) water. The pH was adjusted using sulfuric acid. Each leachate treatment consisted of five replicates and the analysis ran for seven days. The leaching of phosphate and ammoniacal nitrogen in each reactor was measured every two days in triplicates. Any medium or water removed from the tubes was replaced with DI water at the treatment's corresponding pH before resuming the experiment. Ammoniacal nitrogen ($NH_3$—N) and phosphates ($PO_4^{3-}$) was determined in each sample using the Salicylate TNT Method 10031 and Phosver 3 Method 8048, respectively, with a HACH DR5000 spectrometer (HACH Company, Colorado, USA). The pH levels in all tubes remained the same during the experimental period. At the end of the experiment the leachate, which is CM with leached nutrients, was autoclaved (121° C.) and stored at 4° C.

Growth study with leached nutrients. At the beginning of each cultivation test, the inoculum was centrifuged at 4,500 g's using a Beckman Coulter Allegra X-15R Centrifuge (Beckman Coulter Inc., California USA) and the supernatant was discarded. The remaining algae pellets were re-suspended in either CM or the sterile leachate derived from a pH of 2.5 described in section previously. Growth was monitored spectrophotometrically with a HACH DR5000 UV-Vis spectrophotometer at a wavelength of 750 nm. Ash-free dry weight (AFDW) in g $L^{-1}$ was determined using $O.D._{750}$ values and an $O.D._{750}$ to AFDW correlation coefficient:

$$AFDW(g\ L^{-1}) = 0.54 * (OD@750\ nm) + 0.023$$

Initial growth studies were conducted in a 250 μL microplate assay to test the influence of leached nutrients compared to the standard growth medium. A total of 10 reactors of each condition were used in this test. The optical density throughout the growth experiments was tested using a plate reader (SpectraMax i3, Molecular Devices, CA, USA). The microplate was housed in an incubator (Percival Company, IA, USA), where the $CO_2$ level was maintained at 2-3% (vol./vol.) throughout the experiments.

A volumetric scale-up was done to analyze the possible effects on the growth that could change the growth rate. The cultures were grown in 16 mm borosilicate glass tubes, capped with plastic caps, and sealed with PARAFILM to reduce evaporative losses. Each tube was inoculated with 6 mL of culture and placed in the outer rim of a roller drum (New Brunswick Scientific Company, Eppendorf, CT, USA) rotating at 16 rpm. The roller drum was housed in the same incubator (where the $CO_2$ level was maintained at 2-3%) throughout the tests.

Analysis of biomass and HTL products. The proximate and biochemical composition of the GS 5587.1 feedstock described here is presented in Table 2. The GS 5587.1 strain from this study consisted of 53.25 wt % measured as proteins and 8.85 wt % measured as lipids (Fatty Acid Methyl Esters (FAME)). The high protein content indicates that GS is a high protein algae.

TABLE 2

Analysis of the algal biomass feedstock

| Species | GS |
|---|---|
| Proximate (wt %) | |
| Ash content | 2.41 |
| Moisture | 70.00 |
| Biochemical (wt %) | |
| Lipids | 8.85 |
| Proteins | 53.25 |
| Carbohydrates[a] | 35.49 |
| HHV, MJ/kg | 15.80 |

[a]Carbohydrates = 100-Sum (Lipids + Proteins + Ash);
HHV: High Heating Value

The biocrude oil yield at 300° C. was measured to be 32.12 wt %, biochar yield at 2.74 wt %, and water-soluble compounds (WSC) at 6.84 wt %. It is evident that the reported biocrude yield (32.12 wt %), as seen in Table 3, was more than the initial lipid content (8.85 wt %), proving the conversion of other major biochemical components in the biomass like proteins and carbohydrates into biocrude.

TABLE 3

Product yields from hydrothermal liquefaction of GS at 300° C., 30 min residence time, and 20 wt % solid loading.

| Product | Yield, % |
|---|---|
| Biocrude | 32.12 ± 3.73 |
| Biochar | 2.74 ± 0.37 |
| Water-soluble compounds | 6.87 ± 2.42 |
| Gas phase and loss* | 58.27 ± 6.35 |

*Gas phase and loss = 100-Sum (biocrude + biochar + Water-soluble compounds)

Table 4 presents the elemental analysis and inorganic metal content of the GS 5587.1 biomass, HTL biocrude, and HTL biochar. The biomass has at least half of its weight as carbon (51.44 wt %) with oxygen (20.45 wt %) and nitrogen (11.14 wt %) as the other major components. The HTL biocrude on the product fraction showed an increase in carbon and hydrogen content owing to the removal of heteroatoms during the liquefaction process. HTL also helped in the deoxygenation process and led to a decrease in the oxygen content of biocrude to 5.26 wt % from 20.45 wt % in the biomass. A similar effect was also observed in the case of biochar, where the measured oxygen content was reduced to 1.86 wt %.

TABLE 4

Inorganic metal and elemental analysis of the microalgae, HTL biocrude, and HTL biochar

| Element | Unit | GS | Biocrude | Biochar |
|---|---|---|---|---|
| Phosphorous | wt % | 1.45 | 0.01 | 15.98 |
| Carbon | wt % | 51.44 | 73.89 | 42.90 |
| Hydrogen | wt % | 7.83 | 9.13 | 4.67 |
| Nitrogen | wt % | 11.14 | 7.25 | 5.27 |
| Sulfur | wt % | 1.83 | 2.31 | 0.74 |
| Calcium | wt % | 0.15 | 0.05 | 0.36 |
| Iron | wt % | 0.04 | 0.06 | 0.19 |
| Magnesium | wt % | 0.08 | 0.00 | 1.30 |
| Molybdenum | wt % | 1.51 | 0.45 | 1.53 |
| Nickel | wt % | 0.27 | 0.18 | 2.49 |
| Potassium | wt % | 0.24 | 0.00 | 0.01 |
| Sodium | wt % | 1.68 | 0.49 | 3.73 |
| Zinc | wt % | 0.44 | 0.91 | 2.99 |
| Oxygen* | wt % | 20.45 | 5.26 | 1.86 |
| O/C | mol/mol | 0.29 | 0.05 | 0.03 |
| H/C | mol/mol | 1.81 | 1.47 | 1.29 |
| HHV | MJ/kg | 15.80 | 36.42 | 24.51 |

*Oxygen content, wt % = 100 - Sum of all the elements;
HHV: Higher Heating Value (MJ/kg)

Figure 2A:
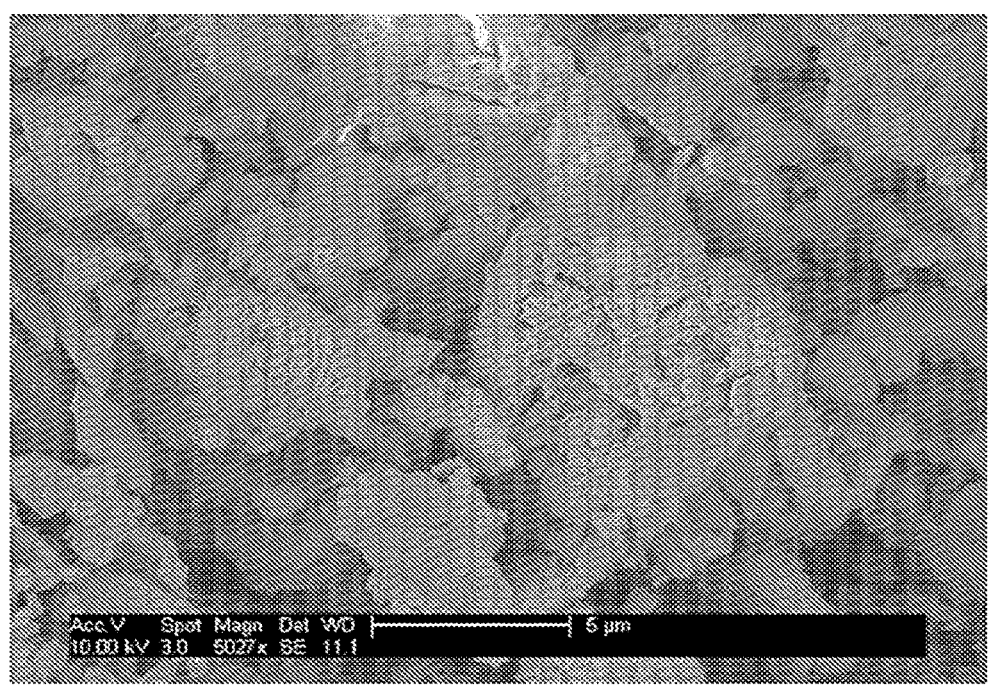
FIG. 2A shows a scanning electron microscope (SEM) image of the HTL biochar particles from red algae *Galdieria sulphuraria* (GS) feedstock.
Figure 2B:
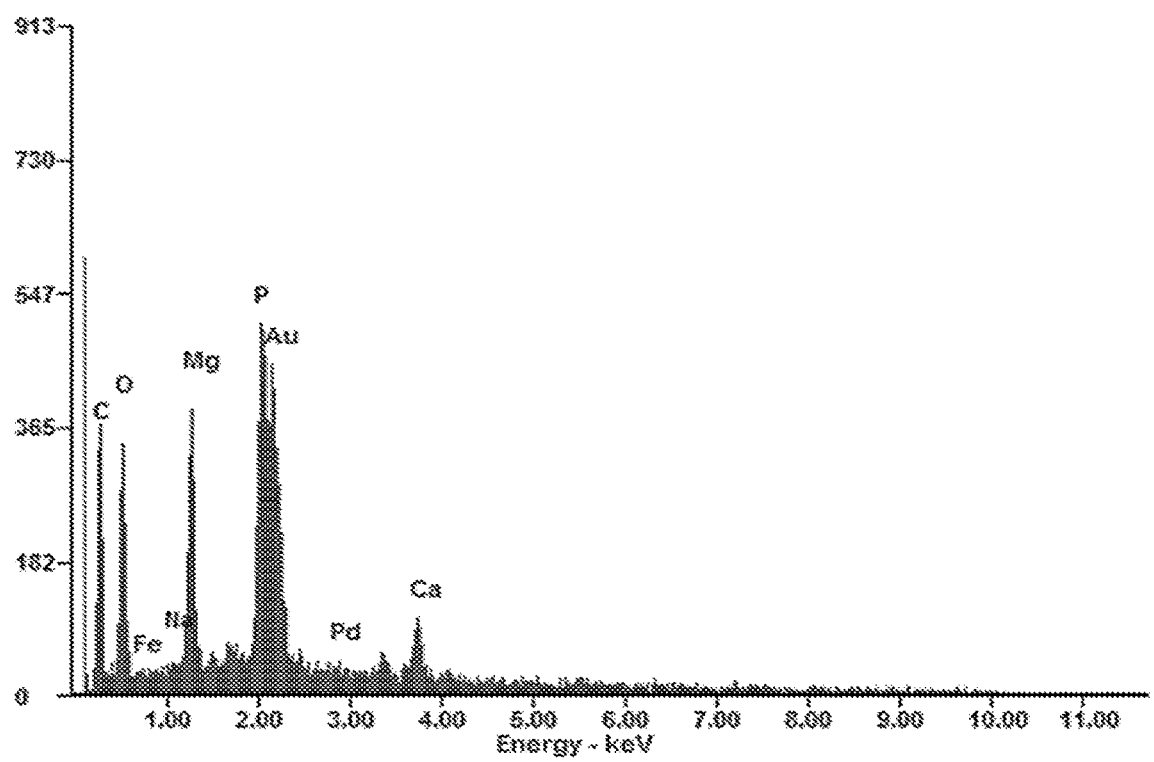
FIG. 2B shows an energy-dispersive X-ray (EDX) analysis of the HTL biochar from GS feedstock.

Table 4 also reports the presence of inorganic elements such as phosphorous (P), calcium (Ca), iron (Fe), magnesium (Mg), molybdenum (Mo), nickel (Ni), potassium (K), sodium (Na), and zinc (Zn). Phosphorous and sodium were the dominant inorganic elements present in the biomass. A very low concentration of metals was seen in the HTL biocrude. Conversely, the HTL biochar consisted of a large concentration of metals. This explains the fact that most of the metals are insoluble in the dichloromethane or the water-soluble compound phase. Among the metals reported, phosphorous was the dominant metal found in the biochar, followed by sodium, zinc, nickel, molybdenum, and magnesium. FIGS. 2A and 2B show the scanning electron microsope (SEM) image and energy-dispersive X-ray (EDX) elemental mapping data, respectively, of the HTL biochar particles. The results indicated that biochar particle sizes varied from 2-300 μm. The elemental data from EDX verified the ICP-OES data and proved the presence of phosphorous, magnesium, calcium, sodium, iron, carbon, and oxygen.

Effect of pH on the leaching of nutrients from the biochar. The biochar derived from GS 5587.1 biomass contained 15.98 wt % of phosphorus. Controlling the pH of a medium can aid in leaching nutrients from materials like biochar. An increased presence of $H^+$ or $OH^-$ in the medium is reported to have denaturing effects on the biochar surface, much like the activation of carbonaceous compounds.

The $pK_a$ value for phosphoric acid is 2.16; this and the speciation data for phosphoric acid suggest optimal leaching at a pH less than 2.5. The choice of a lower pH range for this study stems from the speciation data and optimum growth conditions for G. sulphuraria. The acidic range would ensure that leaching can be done both before and during the growth of G. sulphuraria in a reactor. This range of pH in this analysis was chosen to optimize the application of the process in the industry with low or minimal operational costs. A higher pH would call for an extra step before growth to reduce the medium pH below 4.0.

Figure 3:
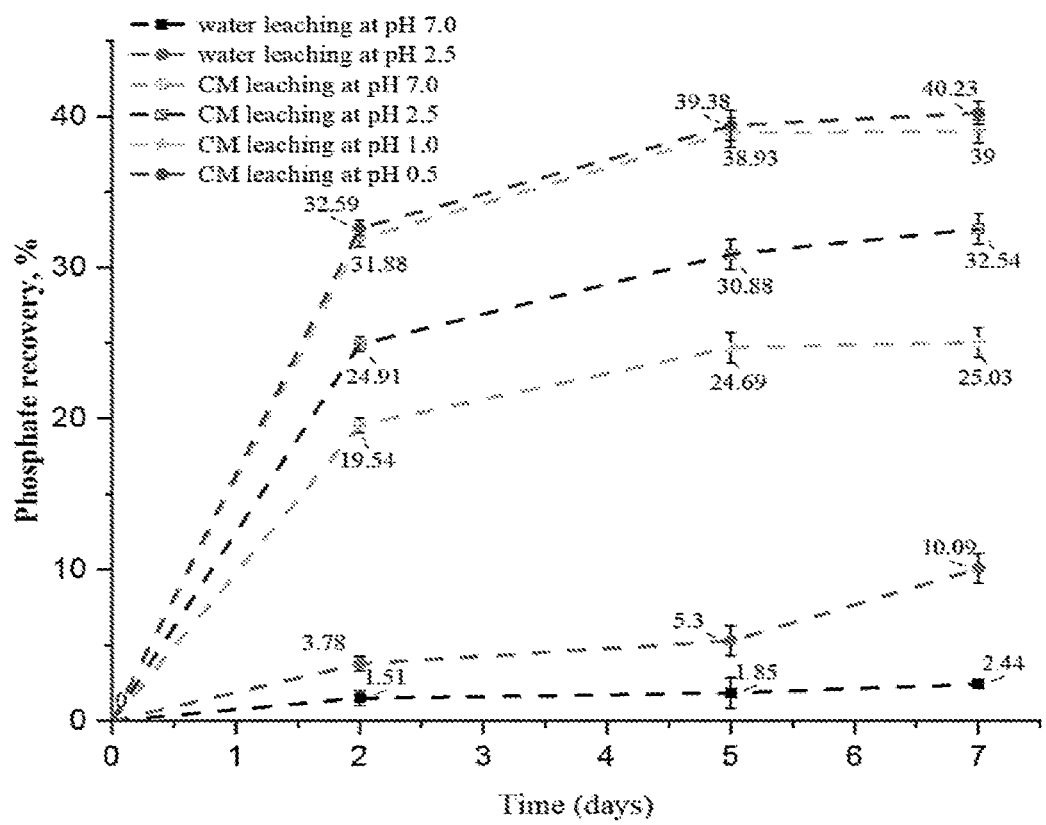
FIG. 3 shows the leaching of phosphates from HTL biochar as a function of time using water or cyanidium medium (CM) at different pH values.

FIG. 3 shows the leaching of phosphates from HTL biochar as a function of time using water or cyanidium medium (CM) at different pH values. As shown in FIG. 3, the leaching of phosphates from biochar varied greatly depending on the pH of the leaching medium. In CM with pH values lower than 7.0, the percentage of leached phosphates into the medium from biochar was seen to increase as pH decreases. The recorded phosphate recovery in CM at pH 7.0 was 25.03%, while recovery of 32.54% was seen at pH 2.5. These results were compared with a control set, phosphates leaching into the water at pH 2.5 and 7.0, where phosphates recovery was 10.09% and 2.44%, respectively. This almost four-fold difference in leachability can be attributed to the difference in pH values. The phosphate leaching in CM at pH of 1.0 and 0.5 resulted in a percentage recovery of 40.23% and 39.00%, respectively. With consideration of the standard deviation of leaching at pH of 0.5 and 1.0 over seven days, it is evident that these cases are approximately similar in recovery efficiency. Since pH 2.5 provides considerable leaching and with a lower required input of sulfuric acid, a pH of 2.5 can be an economically feasible option. This pH minimizes both the number of acidifying steps and the overhead operational costs for executing the nutrient recovery process. The phosphorus leached into the medium at pH 2.5 can be immediately used to grow G. sulphuraria as this is an optimum growth pH for the strain.

Figure 4:
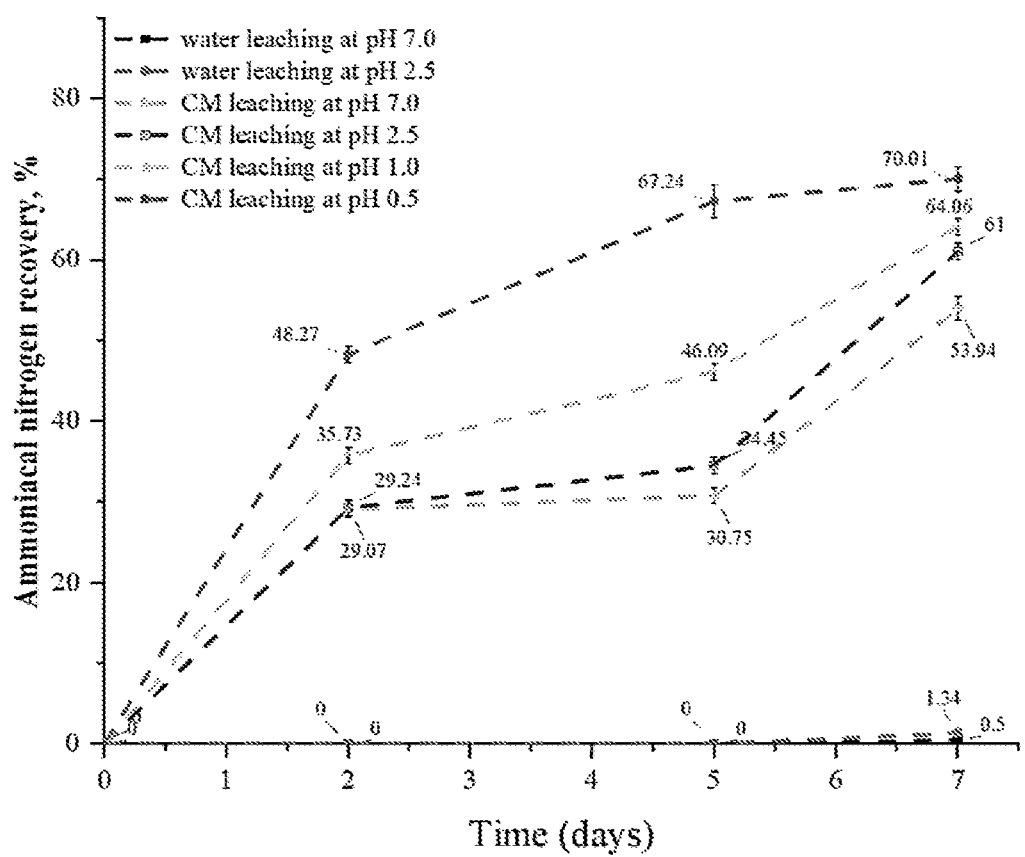
FIG. 4 shows the leaching of ammoniacal nitrogen from HTL biochar as a function of time using water or CM at different pH values.

FIG. 4 shows the leaching of ammoniacal nitrogen from HTL biochar as a function of time using water or CM at different pH values. The level of ammoniacal nitrogen leached from the biochar increased as pH of the CM was decreased, as was observed in the phosphorus results. In contrast, leaching of ammoniacal nitrogen in the water controls was negligible with only 1.34% leaching seen with water at pH 2.5. The leaching of ammoniacal nitrogen in CM at pH 2.5 and 7.0 was 61.00% and 53.94%, respectively. This difference may be due to the possible interactions of the medium with the biochar surface and potential ionic strength in the medium. A maximum recovery of 64.06% and 70.01% ammoniacal nitrogen from biochar was observed at a pH of 1.0 and 0.5, respectively. The initial amount of phosphorous and nitrogen in the biochar was reported to be 15.98 wt % and 5.27 wt %, respectively.

Figure 5:
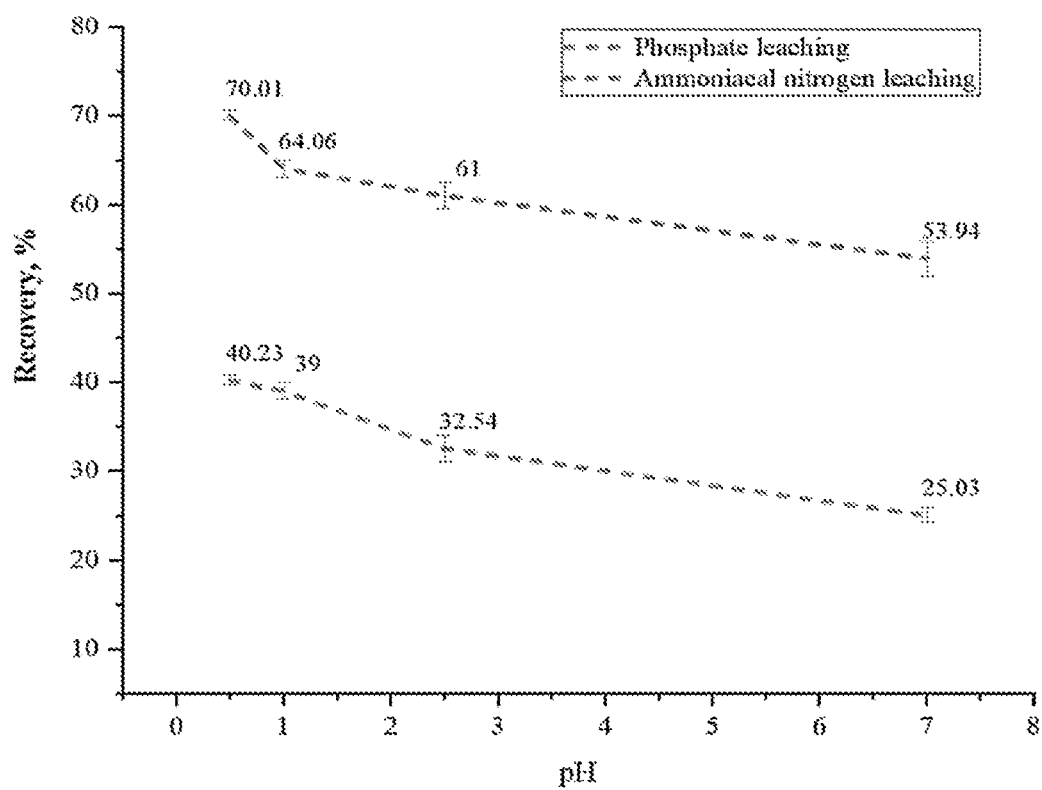
FIG. 5 shows the recovery of phosphates and ammoniacal nitrogen from HTL biochar as a function of pH.

FIG. 5 shows the recovery of phosphates and ammoniacal nitrogen from HTL biochar as a function of pH. As is evident from FIGS. 3-5, the best leaching of phosphorous and nitrogen from HTL biochar was observed at pH 0.5. However, the associated cost of reducing pH to 0.5 may not justify the ~6% and ~9% increase in recovery of phosphates and ammoniacal nitrogen. Utilizing CM at a pH of 2.5 in the leaching step is more economically feasible at scale. Employing the above-mentioned acidic leaching process at pH 2.5, leaching of phosphorous as phosphates were 32.54% efficient (i.e., 4.95 wt % leached) and 61% efficient (i.e., 3.21 wt % leached) for leaching of nitrogen as ammoniacal nitrogen.

Mass balance of products from HTL and leaching. The products from HTL were analyzed for carbon, hydrogen, nitrogen, sulfur, phosphorus, and oxygen. Table 5 shows the mass balance with the percent recovery based on product composition. Based on the mass balance calculations, 52.27 wt % of the elemental carbon was recovered from the HTL products of biocrude oil, water-soluble products, and biochar. This suggests that the remaining carbon fraction was released in the form of gaseous products and losses during the HTL procedure. The composition of the gaseous fraction was not analyzed as a part of the current disclosure. In the case of hydrogen mass balance, ~45 wt % of the initial hydrogen was recovered in the overall process. The nitrogen and sulfur recovery were ~31.33 and 44.91 wt %, respectively. The recovery percentage of oxygen was ~20% suggesting that more than 75 wt % of the initial oxygen was lost in the gas phase as seen with carbon. The majority of phosphorous found in biochar (~88.29%) was recovered from the initial 1.45 wt % in the dry biomass. In the case of phosphorous, the majority was found in biochar, and a recovery of 88.29% was reported, also, at 1.19 wt % of initial nitrogen in the dry biomass was reported in the biochar fraction. These nutrients in the biochar were leached using leaching conditions at pH 2.5 (described above).

TABLE 5

Mass Balance and elemental recovery from the hydrothermal liquefaction process

| Element | Dry Algae % | Dry Algae g | Biocrude % | Biocrude g | Biochar % | Biochar g | WSC % | WSC g | Recovery** % |
|---|---|---|---|---|---|---|---|---|---|
| Carbon | 51.44 | 15.57 | 73.89 | 7.16 | 42.90 | 0.36 | 29.82 | 0.62 | 52.27 |
| Hydrogen | 7.83 | 2.37 | 9.13 | 0.88 | 4.67 | 0.04 | 6.80 | 0.14 | 44.95 |
| Nitrogen | 11.14 | 3.37 | 7.25 | 0.70 | 5.27 | 0.04 | 14.88 | 0.31 | 31.33 |
| Sulfur | 1.83 | 0.55 | 2.31 | 0.22 | 0.74 | 0.01 | 0.90 | 0.02 | 44.91 |
| Phosphorous | 1.45 | 0.44 | 0.01 | 0.01 | 15.98 | 0.13 | 11.74 | 0.24 | 88.29 |
| Oxygen* | 26.31 | 7.89 | 7.41 | 0.59 | 30.44 | 0.37 | 35.86 | 0.99 | 24.67 |

*Oxygen content = 100 - Sum (C, H, N, S, P)

$$**\text{Recovery} = \frac{\{(\text{mass of element in biocrude}) + (\text{mass of element in biochar}) + (\text{mass of element in WSC})\}}{\text{mass of element in dry algae}} * 100$$

Figures 6A, 6B:
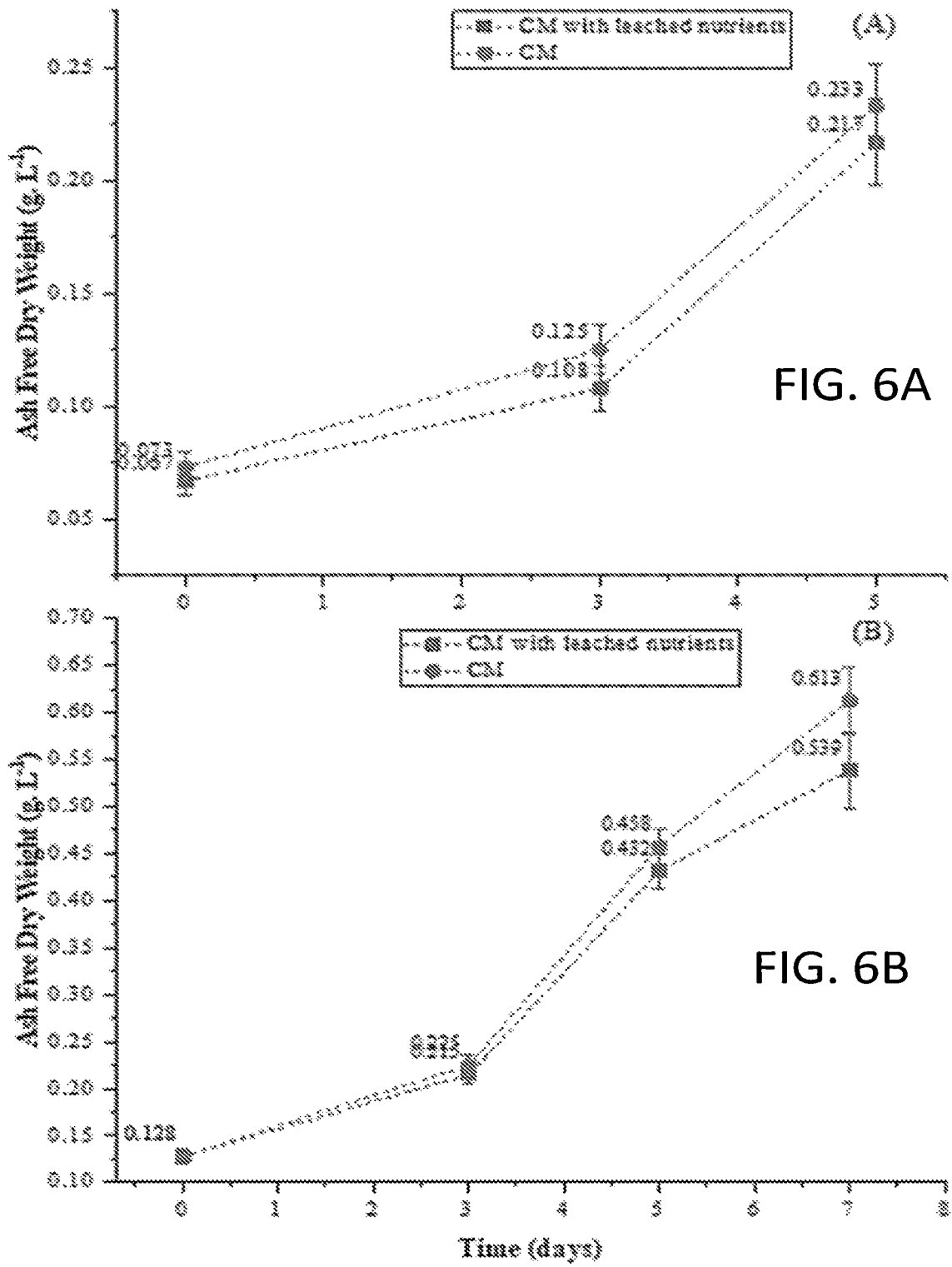
FIGS. 6A and 6B show the growth of GS in a 96 well microplate assay and a 16 mm tubular reactor, respectively.

Comparative growth of *G. sulphuraria* in standard medium compared to leached medium. To test if *Galdieria* can utilize the nutrients leached from the biochar post HTL without inhibition, growth as determined by AFDW of *G. sulphuraria* 5587.1 was evaluated. FIG. 6A shows the results for the algae grown in 96 well microliter plates agitated with shaker tables. FIG. 6B shows the results for algae grown in 16 mm culture tubes agitated with tissue culture roller drums. The composition of leached medium was normalized to match the ammoniacal nitrogen and phosphate levels in CM levels (~260 mg $L^{-1}$ N—$NH_3$ and at 70 mg $L^{-1}$ P, respectively). Cultures with leached nutrients were compared to *G. sulphuraria* cultures grown in standard CM. The growth of *G. sulphuraria* in leached CM was comparable to that in standard medium for both reactor systems and there was no inhibitory effect on the biomass growth by the leached nutrients. The almost identical growth rates prove that the use of leached medium to grow microalgae is feasible. The ash-free dry weight increased from 0.128 g/L to 0.613 g/L in the leached medium compared to 0.539 g/L in standard medium. These results confirm that *G. sulphuraria* can be successfully grown using recycled biochar from hydrothermal liquefaction. Results shown in FIG. 6B using a tubular photobioreactor were similar to the results obtained for results shown in FIG. 6A for the microplate assay. This study was a volumetric scale-up from the 250 μL reactor to 6 ml. This scale-up (~24 fold) did not show a significant difference in the results.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of processing algae, the method comprising:
    liquefying algae to yield a mixture comprising:
        biocrude oil;
        biochar; and
        an aqueous component;
    separating the biochar from the mixture; and
    treating the biochar to yield a nutrient composition comprising ammoniacal nitrogen and phosphate,
    wherein treating the biochar comprises forming an aqueous mixture comprising the biochar and an algal growth medium.

2. The method of claim 1, wherein liquefying the algae comprises heating the algae to a temperature in a range of about 300° C. to about 350° C.

3. The method of claim 2, wherein liquefying the algae occurs at a pressure greater than atmospheric pressure.

4. The method of claim 3, wherein the pressure greater than atmospheric pressure comprises pressure in a range of about 20 bar to about 100 bar.

5. The method of claim 1, wherein the algae comprises *Galdieria sulphuraria*.

6. The method of claim 1, wherein treating the biochar comprises extracting the ammoniacal nitrogen and phosphate from the biochar.

7. The method of claim 1, wherein the algal growth medium comprises a cyanidium mixture.

8. The method of claim 1, wherein treating the biochar further comprises adjusting a pH of the aqueous mixture to a pH less than 7.

9. The method of claim 8, wherein adjusting the pH comprises combining acid with the aqueous mixture.

10. The method of claim 8, wherein adjusting the pH of the aqueous mixture to a pH less than 7 comprises adjusting the pH of the aqueous mixture in a range of about 2 to about 3.

11. The method of claim 8, further comprising removing the biochar from the aqueous mixture to yield the nutrient composition comprising the ammoniacal nitrogen and the phosphate.

12. The method of claim 11, further comprising cultivating additional algae with the nutrient composition.

13. The method of claim 12, further comprising harvesting the additional algae from the nutrient composition to yield harvested algae.

14. The method of claim 13, further comprising liquefying the harvested algae.

15. The method of claim 13, further comprising forming a biofuel from the harvested algae.

16. The method of claim 1, further comprising combining the nutrient composition with an algal growth medium.

17. The method of claim 16, wherein the algal growth medium comprises a cyanidium medium.

* * * * *